(12) United States Patent
Nose et al.

(10) Patent No.: US 7,616,287 B2
(45) Date of Patent: Nov. 10, 2009

(54) LIQUID CRYSTAL DISPLAY ELEMENT

(75) Inventors: Masaki Nose, Kawasaki (JP); Junji Tomita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 148 days.

(21) Appl. No.: 11/842,475

(22) Filed: Aug. 21, 2007

(65) Prior Publication Data

US 2007/0285611 A1   Dec. 13, 2007

Related U.S. Application Data

(63) Continuation of application No. PCT/JP2005/002690, filed on Feb. 21, 2005.

(51) Int. Cl.
*C09K 19/02* (2006.01)
(52) U.S. Cl. .................. 349/175; 349/179; 349/185
(58) Field of Classification Search ............ 349/175, 349/172, 179, 138, 185, 186
See application file for complete search history.

(56) References Cited

U.S. PATENT DOCUMENTS

| 6,683,672 | B2 * | 1/2004 | Ueda et al. ............... 349/176 |
| 6,900,469 | B2 * | 5/2005 | Kitahora et al. ............ 257/82 |
| 6,927,765 | B1 | 8/2005 | Masazumi et al. |
| 2001/0040542 | A1 * | 11/2001 | Harada et al. ............. 345/87 |
| 2002/0171789 | A1 * | 11/2002 | Ueda et al. ............... 349/106 |

FOREIGN PATENT DOCUMENTS

| CN | 1461337 A | 10/2003 |
| JP | 2000-129261 A | 5/2000 |
| JP | 2000-147465 A | 5/2000 |
| JP | 2000-147466 A | 5/2000 |
| JP | 2002-012865 A | 1/2002 |
| JP | 2002-363564 A | 12/2002 |
| JP | 2003-295224 A | 10/2003 |
| JP | 2003-295225 | * 10/2003 |
| JP | 2003-295225 A | 10/2003 |
| JP | 2003-315760 | * 11/2003 |
| JP | 2003-315760 A | 11/2003 |

OTHER PUBLICATIONS

International Search Report of PCT/JP2005/002690, date of mailing Jun. 14, 2005.
Chinese Office Action dated Aug. 8, 2008, issued in corresponding Chinese Patent Application No. 20050048278.5.

* cited by examiner

*Primary Examiner*—Mike Qi
(74) *Attorney, Agent, or Firm*—Westerman, Hattori, Daniels & Adrian, LLP

(57) ABSTRACT

A liquid crystal display element according to the present invention includes one or more sets of combinations of a pair of substrates, a liquid crystal layer composed of a liquid crystal composition indicating a cholesteric phase and disposed between the pair of substrates, and at least one layer of insulating thin film to insulate the liquid crystal layer from an electrode, wherein: the insulating thin film has an electrostatic capacity of not more than 10 μF; the liquid crystal layer has a layer thickness in the range of 2 to 5 μm; and the liquid crystal composition has a dielectric anisotropy in the range of 20 to 50. The present invention can realize at least one of lowered driving voltage, enlarged operating temperature range, decrease in electric power consumption and wide display maintaining temperature range, in a liquid crystal display element having a semi-permanent display maintaining function (memory function).

18 Claims, 14 Drawing Sheets

FIG. 1
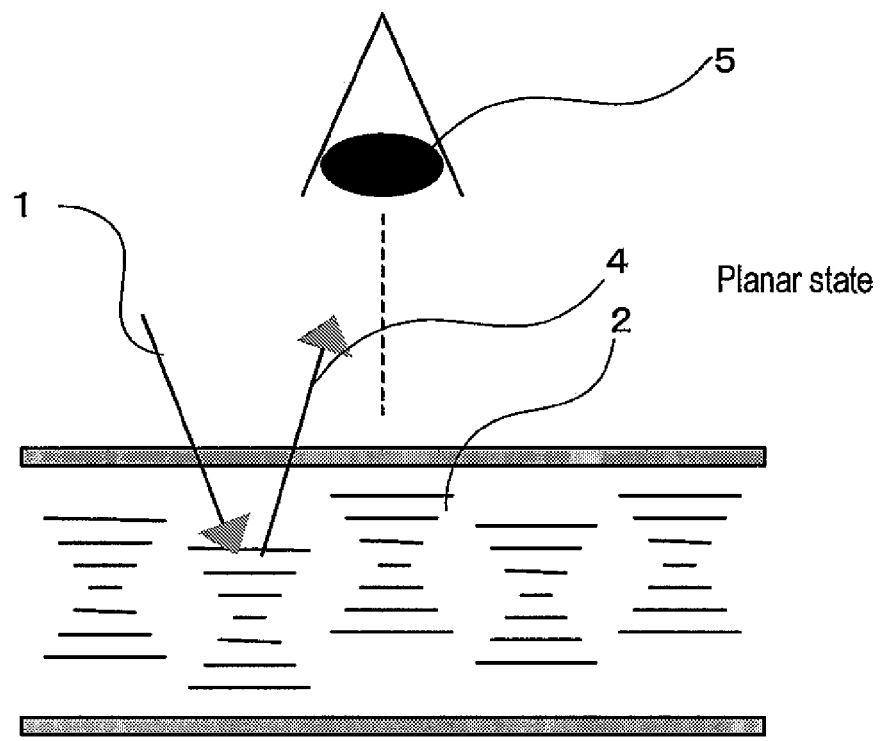
Planar state
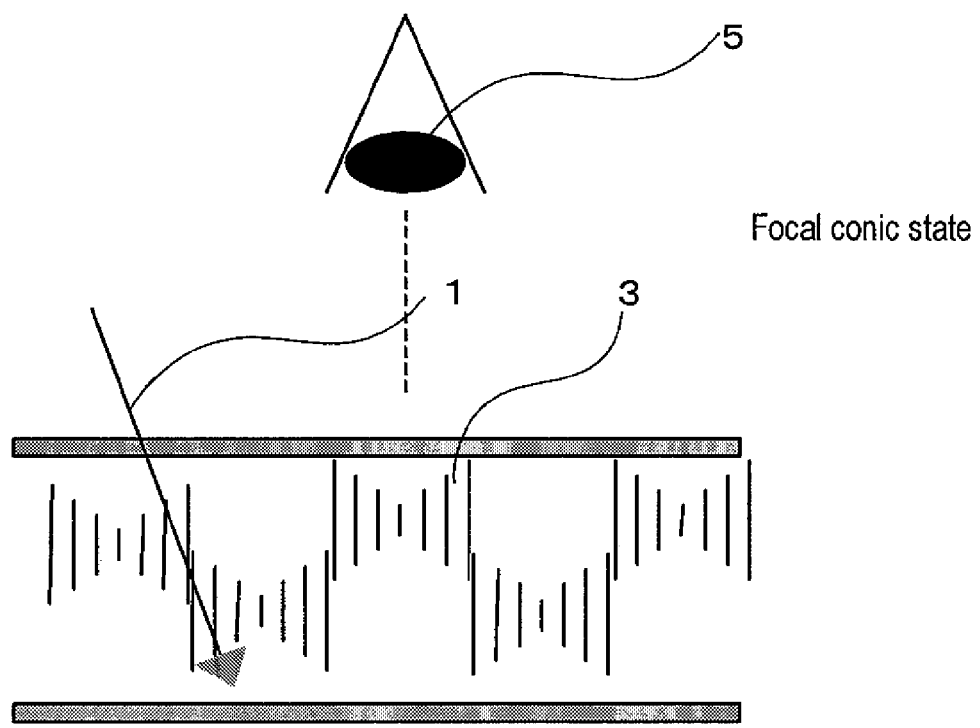
Focal conic state

FIG. 5
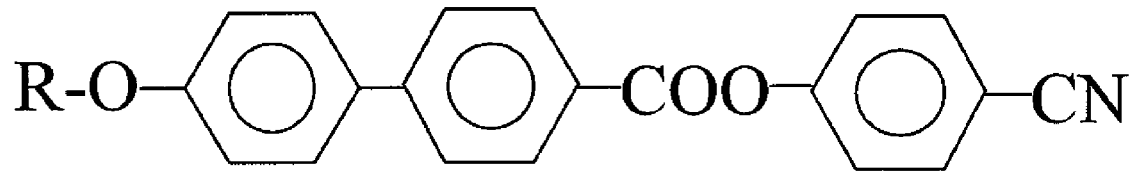
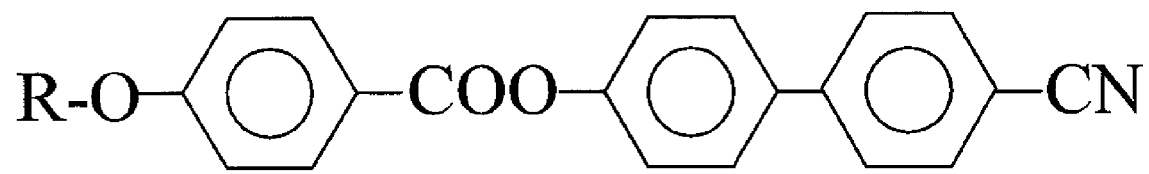

FIG. 13

| | Structural formulae | | $\overline{\Delta\varepsilon}^{*1}$ | $\nu$/mm²s⁻¹ *² | $\Delta n^{*3}$ | Ref. |
|---|---|---|---|---|---|---|
| a) | C₇H₁₅–⟨⟩–COO–⟨⟩–CN | C 45 N 57 I | +20.7 | 56 | 0.16 | 13 |
| b) | C₅H₁₁–⟨⟩–⟨⟩–CN | C 23 N 35 I | +11.0 | 24 | 0.184 | 10 |
| c) | C₅H₁₁–⟨⟩–⟨⟩–CN | C 31 N 55 I | +13.0 | 21 | 0.124 | 14 |
| d) | C₅H₁₁–⟨⟩–⟨⟩–CN | C 71 N 83 I | +4.5 | 65 | 0.06 | 15 |
| e) | C₅H₁₁–⟨⟩–COO–⟨⟩–CN | C 47 N 69 I | +9.3 | 44 | 0.129 | 16 |
| f) | C₅H₁₁–⟨⟩–CH₂CH₂–⟨⟩–CN | C 38 N 44.5 I | +11.4 | 19.5 | 0.117 | 17 |
| g) | C₅H₁₁–⟨⟩–⟨⟩(F)–CN | C 13 (N 5) I | +17.7 | 28 | 0.092 | 18 |
| h) | C₅H₁₁–⟨O,O⟩–⟨⟩–CN | C 55 (N 48) I | +17.4 | 47 | 0.141 | 19 |
| i) | C₅H₁₁–⟨N,N⟩–⟨⟩–CN | C 71 (N 53) I | +34.0 | 55 | 0.224 | 20 |
| j) | C₅H₁₁–⟨⟩–COO–⟨⟩(F)–CN | C 30 (N 24) I | +35.9 | 65 | 0.150 | 21 |
| k) | C₅H₁₁–⟨⟩–⟨⟩–NCS | C 67.5 (N 49.5) I | +10.8 | 12 | 0.173 | 23 |
| l) | CH₂=CH-CH₂-⟨⟩–⟨⟩–CN | C 60 N 74 I | +13.7 | 23 | 0.147 | 24 |
| m) | C₅H₁₁–⟨⟩–⟨⟩–⟨⟩–CN | C 60.4 N 233.6 I | +13.2 | 94 | 0.212 | 25 |
| n) | C₅H₁₁–⟨⟩–⟨⟩–⟨⟩–CN | C 96 N 219 I | +11.0 | 90 | 0.254 | 26 |
| o) | C₃H₇–⟨⟩–⟨⟩–CH₂CH₂–⟨⟩–CN | C 69 N 196 I | +12.0 | 75 | 0.208 | 27 |

FIG. 14

| | Structural formulae | Δε*1 | ν/mm²s⁻¹*2 | Δn*3 | Ref. |
|---|---|---|---|---|---|
| a) | C₅H₁₁—⟨⟩—⟨⟩—F, F  C −6.1 I | 6.0 | 7.0 | 0.024 | 69 |
| b) | C₅H₁₁—⟨⟩—CH₂CH₂—⟨⟩—F, F  C 2.8 (N −39.1) I | 6.0 | 16.0 | 0.024 | 70 |
| c) | C₅H₁₁—⟨⟩—⟨⟩—⟨⟩—F  C 66.4 S₈ 75.4 N 156.1 I | 7.0 | 16.0 | 0.100 | 71 |
| d) | C₅H₁₁—⟨⟩—⟨⟩—⟨⟩—F, F  C 45.2 N 125.0 I | 9.0 | 21.0 | 0.080 | 71 |
| e) | C₅H₁₁—⟨⟩—CH₂CH₂—⟨⟩—⟨⟩—F, F  C 87.6 N 110.6 I | 9.0 | 22.0 | 0.079 | 72 |
| f) | C₅H₁₁—⟨⟩—⟨⟩—CH₂CH₂—⟨⟩—F, F  C 50.8 S₈ 74.1 N 121.5 I | 9.0 | 21.0 | 0.079 | 70 |
| g) | C₅H₁₁—⟨⟩—CH=CH—⟨⟩—⟨⟩—F, F  C 31.0 N 136.2 I | 9.0 | 22.0 | 0.114 | 73 |
| h) | C₅H₁₁—⟨⟩—⟨⟩—⟨⟩—F, F  C 55.1 N 108.2 I | 10.0 | 30.0 | 0.120 | 74 |
| i) | C₅H₁₁—⟨⟩—⟨⟩—OCF₃  C 14 I | 7.1 | 4.0 | 0.040 | 75 |
| j) | C₅H₁₁—⟨⟩—⟨⟩—⟨⟩—OCF₃  C 52 S₈ 73 N 156 I | 8.0 | 17.0 | 0.100 | 75 |
| k) | C₅H₁₁—⟨⟩—⟨⟩—⟨⟩—OCHF₂  C 37 S₈ 102 N 147 I | 9.0 | 19.0 | 0.110 | 75 |
| l) | C₅H₁₁—⟨⟩—⟨⟩—⟨⟩—OCF₃  C 43 S₈ 128 N 147 I | 8.9 | 16.0 | 0.140 | 75 |
| m) | C₅H₁₁—⟨⟩—⟨⟩—C≡C—⟨⟩—OCF₃  C 88 S₈ 126 S_A 163 N 198 I | 9.7 | 17.0 | 0.190 | 75 |

LIQUID CRYSTAL DISPLAY ELEMENT

CROSS-REFERENCE TO RELATED APPLICATIONS

This application is a continuation of International Application No. PCT/JP2005/002690, filed on Feb. 21, 2005, now pending, herein incorporated by reference.

BACKGROUND OF THE INVENTION

1. Field of the Invention

The present invention relates to a liquid crystal display element using a cholesteric liquid crystal.

2. Description of the Related Art

Recently, the development of electronic paper has been advancing vigorously in business organizations and universities. For the electronic paper application markets that are expected, proposed are various application forms including electronic books heading the list, sub-displays for mobile terminals, display parts for IC cards, etc.

One of the most promising modes for the electronic paper is one using a cholesteric liquid crystal. Cholesteric liquid crystals have excellent characteristics such as semi-permanent display maintaining function (memory function), bright color display, high contrast, and high resolution.

Cholesteric liquid crystals are sometimes called chiral nematic liquid crystals. A cholesteric liquid crystal can be obtained by adding a relatively large amount (several tens of percentage by weight, for example) of a chiral additive (also called chiral agent) into a nematic liquid crystal, to put the nematic crystal molecules in a strongly spirally wound state (which is also called a cholesteric phase), so that the incident light is reflected and interfered.

The principle of display and driving of a liquid crystal display element using a cholesteric liquid crystal is shown below. Display with a cholesteric liquid crystal is controlled by means of the alignment states of the liquid crystal molecules. In the alignment states of a cholesteric liquid crystal, there are a planar state 2 which reflects incident light 1, and a focal conic state 3 which transmits the incident light 1 as shown in FIG. 1. They are present stably under no electric field application. Reflected light 4 enters a human eye 5.

In the planar state, light having a wavelength which corresponds to the spiral pitch of the liquid crystal molecule is reflected. Wavelength λ for which the reflection is the greatest is shown in the following formula with the average refractive index n and the spiral pitch p of the liquid crystal. The reflection band Δλ which is the peak width value at the half height of the reflectance peak when the wave length is plotted as abscissa, and the light reflectance is plotted as ordinate, becomes larger with the increase of the refractive index anisotropy Δn of a liquid crystal. That is, the larger Δn is, the brighter the display is.

$$\lambda = n \cdot p$$

To compare, in the focal conic state, light passes through the cholesteric liquid crystal. Accordingly, it is possible to prevent light reflection by installing a light absorbing layer at the back of the liquid crystal layer, so as to display black color.

FIG. 2-A, B are examples of driving of a liquid crystal display element using a cholesteric liquid crystal. When a strong electric field is applied to a cholesteric liquid crystal, the spiral structure of the liquid crystal molecules becomes completely loose to be in a homeotropic state in which all the molecules follow the direction of the electric field. In this operation, alternating current is applied as shown by numeral 21 in FIG. 2A, so as to prevent the degradation of the liquid crystal. These voltages are the driving voltages to obtain a planar state. When the electric potentials are changed into zero sharply from the homeotropic state (indicated by the numeral 22 in the case of FIG. 2A), the axis of the spiral of the liquid crystal is made perpendicular to the electrode, and the planar state is formed which selectively reflects light, corresponding to the spiral pitch. Here, it is to be noted that although a rectangular shape wave is used in all the cases in this figure, the wave shape is not limited to this, and various shapes may be used in combination.

On the other hand, when voltages (shown by numeral 23 in FIG. 2B) that are so weak that the spiral structure of the liquid crystal molecules of a cholesteric liquid crystal do not become loose are applied (these voltages are the driving voltages for obtaining a focal conic state), followed by the removal of the voltages (shown by numeral 24 in FIG. 2B), or when large voltages are applied, followed by gradual voltage decreasing, the axis of the spiral of the liquid crystal becomes in parallel with the electrodes, forming the focal conic state to transmit incident light. Furthermore, when voltages of a medium level are applied, followed by abrupt removal, there is a mixture of the planar state and focal conic state, making it possible to display an intermediate tone. With a cholesteric liquid crystal, information display is carried out, utilizing these phenomena.

It is known that the response speed of a liquid crystal becomes the larger, the smaller the viscosity of the liquid crystal is, or the smaller the liquid crystal thickness (or cell gap) is. Also, in the case of a cholesteric liquid crystal, the smaller the viscosity is, the quicker the response to a homeotropic state is, when voltages are applied. That is, as the viscosity is made smaller, a planar state is made possible with a shorter pulse width (pulse application time), resulting in decrease of the driving voltages.

Conversely, when the viscosity is larger, the time to get to a homeotropic state becomes longer. Therefore, it is necessary to apply a voltage for a longer time, or apply a higher voltage, in order to achieve a planar state. When the viscosity becomes even higher, a full focal conic state becomes hard to achieve, decreasing the transmittance and increasing scattering of light.

Due to such circumstances, desired contrast is not provided sometimes when a liquid crystal display element is driven at a low temperature. While the viscosity of a liquid crystal composition generally rises as the temperature decreases, it is also important from the viewpoints of driving and display quality to suppress the viscosity rise to as small a extent as possible.

FIG. 3 shows a voltage response characteristic in a solid line during the transition from an initial planar state to a focal conic state. The abscissa axis represents the absolute value of the driving voltages in a set of operations to apply driving voltages, and then stop the application (such as those represented by numerals 21, 23 in FIG. 2-A, B). For example, when the driving voltages are a combination of +32V and −32V, the absolute value is 32V. In the following, the absolute value of driving voltages is sometimes simply called a driving voltage. The liquid crystal reflects light in an initial planar state zone 31. After that, when the absolute value of the pulse voltage (that is, driving voltage) is raised from 0 V, it passes through a transition state zone 32 into a focal conic state zone 33, and when the value is further raised, through a transition state zone 34 into the planar state zone 31.

In contrast, when the liquid crystal changes from the initial focal conic state to the planar state, as shown in a dotted line of FIG. 3, the liquid crystal transmits light in the initial focal conic state zone 35. After that, when the absolute value of the pulse voltage is raised, it passes through a transition state zone 36 into the planar state zone 31.

It is to be noted that while a cholesteric liquid crystals provides a certain level of brightness if its thickness (or cell gap) is 2 μl or larger, the brightness in the planar state is improved as the thickness is increased. For this reason, thicker cell gaps are generally preferred.

Liquid crystal display elements using cholesteric liquid crystals have some problems in practice as follows.

(1) The Driving Voltage of a Liquid Crystal Display Element

The driving voltages of a liquid crystal display element may be divided into a driving voltage to put the liquid crystal in a planar state, a driving voltage to put it in a focal conic state, and a driving voltage to put it in a transition state. However, when the term is used without limitation, they refer to the largest among them, that is, the driving voltage to put the liquid crystal in a planar state.

Modes using a cholesteric liquid crystal employ a higher driving voltage than other modes such as the electrophoresis method for use in electronic paper, that is, in the range of 35 to 60 V, in general. On this account, costs for parts for the driving circuit are rather high. In order to overcome the cost problem with a general-purpose IC for an LCD driver for liquid crystal display elements, a driving voltage of 35 V or below is indispensable, and if a margin is considered, it is important to decrease the driving voltage as low as 32 V or below.

(2) Electric Power Consumption

As RF-ID (Radio-Frequency-Identification: a contact-free individual identification technology to perform identification/communication using electric waves) has been becoming popular rapidly in recent year, demand for a display device in which a liquid crystal display element can be driven via RF (radio waves) is also increasing. In order to apply a cholesteric liquid crystal to this RF-ID, it is important to decrease the electric power consumption, in addition to the above-described decrease of the driving voltage. For this purpose, adjusting the dielectric constant to decrease the electric capacitance to an appropriate level is also necessary, in addition to the prevention of leak current to the utmost through a larger liquid crystal resistance.

(3) Display Maintaining Temperature

Display maintaining temperature means a temperature in which a liquid crystal can maintain the planar state or focal conic state even after a long time period of standing.

In the present level, the planar state or focal conic state can be maintained at least after several days at a temperature generally in the range of about −10 to 60° C., and further expansion of the display maintaining temperature is being desired. For example, a display maintaining temperature in the range as wide as about −20 to 90° C. is being desired for parts for vehicle uses.

SUMMARY OF THE INVENTION

As described above, there are problems to be solved in order to achieve, lowered driving voltage, expanded operating temperature range, reduced electric power consumption and wide range of display maintaining temperature of a liquid crystal display element.

According to one aspect of the present invention, provided is a liquid crystal display element including one or more sets of combinations of a pair of substrates having a pair of electrodes at least one of which is light transmitting, a liquid crystal layer disposed between the pair of substrates and composed of a liquid crystal composition indicating a cholesteric phase, and at least one layer of insulating thin film to insulate the liquid crystal layer from an electrode, wherein:

the insulating thin film having an electrostatic capacity of not more than 10 μF;

the liquid crystal layer having a layer thickness in the range of 2 to 5 μm; and the liquid crystal composition having a dielectric anisotropy in the range of 20 to 50.

By this aspect of the present invention, it is possible to obtain a liquid crystal display element using a cholesteric liquid crystal having features such as semi-permanent display maintaining function (memory function), bright color display, high contrast and high resolution, wherein one or more of lowered driving voltage, expanded operating temperature range, reduced electric power consumption and wide range of display maintaining temperature are achieved.

According to another aspect of the present invention, provided is electronic paper using a liquid crystal display element according to the above-describe aspect. As specific types of electronic paper, preferable are electronic books and devices that perform at least one of contact-free recognition and contact-free communication.

BRIEF DESCRIPTION OF THE DRAWINGS

FIG. 1 is a conceptual view for explaining a planar state 2 and a focal conic state 3 of a cholesteric liquid crystal;

FIG. 2-B is a view showing how driving voltages for obtaining a focal conic state are applied;

FIG. 5 shows chemical formulae of chiral agents used in EXAMPLE 1;

FIG. 13 is a list showing examples of the nematic liquid crystal; and

FIG. 14 is another list showing examples of the nematic liquid crystal.

DESCRIPTION OF THE PREFERRED EMBODIMENTS

Figure 2A:
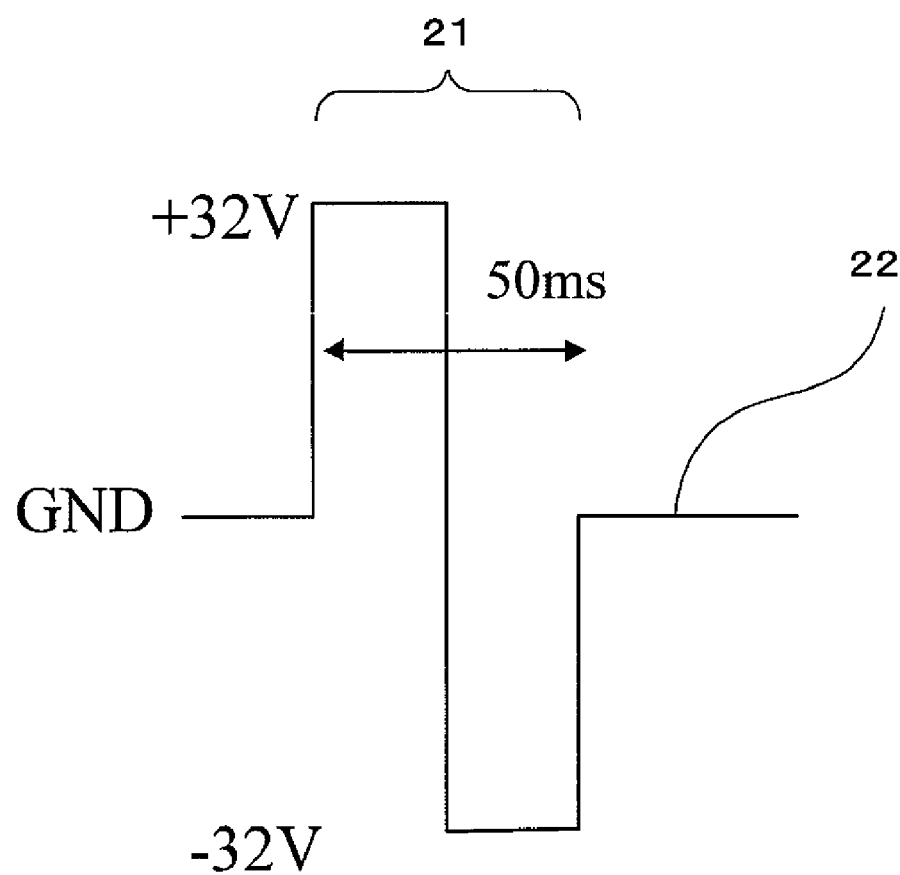
FIG. 2-A is a view showing how driving voltages for obtaining a planar state are applied.

Embodiments of the present invention will now be described below with reference to the drawings, tables, formulae and examples. These drawings, tables, formulae, examples and description are for illustrating the present invention, and not for limiting the scope of the present invention. Needless to say, other embodiments can belong to the category of the present invention as long as they conform to the essential character of the present invention. The same elements in the drawings are denoted with the same reference numbers.

A liquid crystal display element according to the present invention includes one or more sets of combinations of a pair of substrates having a pair of electrodes at least one of which is light transmitting, a liquid crystal layer disposed between the pair of substrates and composed of a liquid crystal composition indicating a cholesteric phase, and at least one layer of insulating thin film to insulate the liquid crystal layer from an electrode. During the operation of the liquid crystal display element, the electrostatic capacity of the insulating thin film is not more than 10 μF; the layer thickness of the liquid crystal layer is in the range of 2 to 5 μm; and the dielectric anisotropy of the liquid crystal composition is in the range of 20 to 50. Under these conditions, it is possible to realize a liquid crystal display element having lowered driving voltage, reduced electric power consumption, and other excellent qualities. When the liquid crystal composition reflects visible light in the planar state, one can see the display with the naked eye. It is to be noted that if the driving voltage is lowered to 35 V or lower, preferably 32 V or lower, general-purpose ICs (those with a voltage resistance of 35 V) can be used for the driving circuit of a liquid crystal display element, providing a cost-effective approach.

Figure 3:
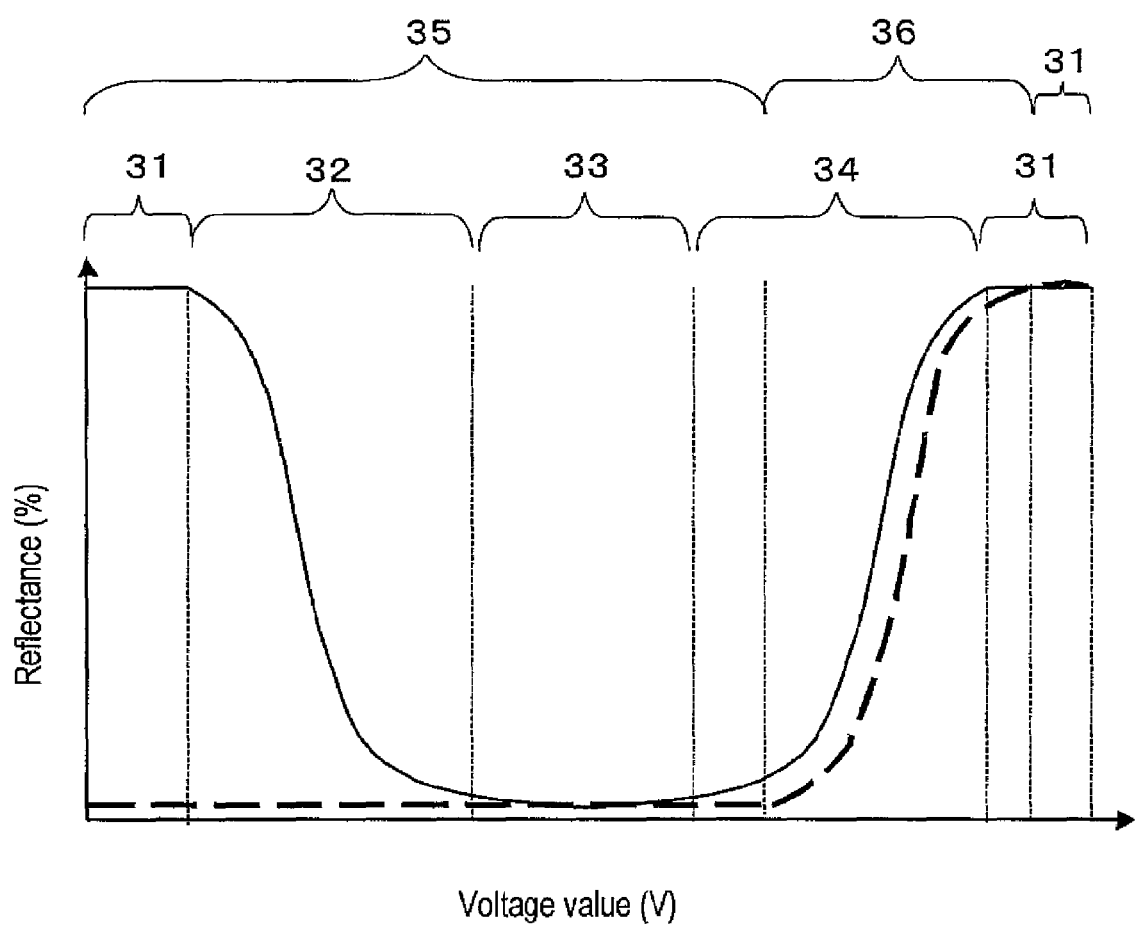
FIG. 3 is a graph showing a change of light reflectance during the transitions from an initial planar state to a focal conic state, and from an initial focal conic state to a planar state.

It was found that the liquid crystal layer thickness in the range of 2 to 5 μm could sufficiently secure a driving voltage margin, achieving both bright display and low voltage driving. The liquid crystal layer thickness of less than 2 μm gives insufficient brightness in the planar state with a narrower driving voltage margin (in other words, providing a narrower driving voltage range to realize the focal conic state), and a problem of unstable display resulted from the fluctuation of this margin caused by temperature change becomes conspicuous. Over 5 μm, although it is possible to sufficiently secure a driving voltage margin, there will appear a problem of a high driving voltage to change into the planar state. The liquid crystal layer thickness is adjusted preferably to about 4 μm, or in the range of 4±0.5 μm. It is to be noted here that the driving voltage margin means, for example, the voltage width shown by the numeral 33 in FIG. 3.

If the insulating thin film has an electrostatic capacity of not more than 10 μF, it is possible to adequately restrain the charging/discharging amount of electric charge of the liquid crystal display element during the driving, and restrict the electric power consumption. It is also possible to improve the insulating properties of the liquid crystal, providing stable operation. If there are two insulating films, the condition of being not more than 10 μF is a condition applied to the sum of electrostatic capacities of both insulating films. If there is no insulating film, problems of increased leak current leading to difficulty in wireless driving, and lowered life of the liquid crystal would occur. The electrostatic capacity can be determined by calculation from the dielectric constant, applied area and thickness of the insulating film.

A value $\Delta\in$ of not less than 20 will widen the selection range of chiral agents that can be used at a low driving voltage. The driving voltage will rise with a value lower than this range, and a value higher than this range will degrade the stability and reliability as an element, being liable to generation of defective images and image noises. The value $\Delta\in$ is a difference between the dielectric constant in the director direction (the average direction of major axes of liquid crystal molecules) and the dielectric constant of its vertical component. It can be determined, for example, by measuring the electrostatic capacities of a cell in which a liquid crystal is introduced in a horizontal alignment, and a cell in which the liquid crystal is introduced in a perpendicular alignment.

Tc is important among other properties of the liquid crystal composition. When the temperature of the liquid crystal composition exceeds Tc, the liquid crystal transfers from a cholesteric phase to an isotropic phase, making its display impossible. Therefore, the higher the temperature, the more preferable it is, because it can realize a wider display maintaining temperature range. Specifically, a Tc of not less than 80° C. is preferable. There is no particular limitation to the upper limit. It seems that about 130° C. is generally the upper limit from the viewpoint of materials therefor. Tc can be easily ascertained by heating a liquid crystal composition in a planar state in a cell to determine the temperature at which the reflectance decreases sharply.

There is no particular limitation to the liquid crystal composition according to the present invention, as long as it indicates a cholesteric phase. It can be selected from among known materials. Those containing a nematic liquid crystal and a chiral agent are generally used. In that case, it is preferable that the $\Delta\in$ of the chiral agent is in the range of 20 to 70, and Tc is in the range of 80 to 130° C. Two or more types of chiral agents may be included in the same composition. In that case, these ranges are applied to the $\Delta\in$ and Tc for these mixtures. When the $\Delta\in$ of a chiral agent or agents is in this range, the $\Delta\in$ of the liquid crystal composition can be easily controlled to the above-described range. The situation is the same for Tc.

Furthermore, it was found that the above-described properties were easily achieved, when two or more types of chiral agents having specifically designed properties for the liquid crystal composition were used. For example, when a liquid crystal composition includes a chiral agent having a $\Delta\in$ in the range of 20 to 70, and a chiral agent having a Tc in the range of 80 to 130° C., the above-described properties can be easily achieved. Taking a mixture of a chiral agent A and chiral agent B, for example, a combination of a chiral agent having a $\Delta\in$ exceeding 20 (25, for example), and a Tc below 80° C. (75° C., for example), and a chiral agent having a $\Delta\in$ below 20 (15, for example), and a Tc exceeding 80° C. (90° C., for example) may be able to give a $\Delta\in$ in the range of 20 to 70 and a Tc of not less than 80° C. as the whole of the chiral agents.

It is preferable that at least one of the chiral agents for use has a plurality of asymmetric carbons in a molecule. By having a plurality of asymmetric carbons in a molecule, the helical twist power (HTP; power to twist a nematic liquid crystal) is raised, making it possible to reflect visible light with a small added amount of a chiral agent. This provides a merit of restricting the viscosity increase.

The liquid crystal composition contains 15 to 40% by weight of a chiral agent, in general. Infrared light that has longer wavelengths than visible light may be reflected below this range, and ultraviolet light that has shorter wavelengths than visible light may be reflected above this range.

There is no particular limitation to the nematic liquid crystal according to the present invention, and it can be selected from known materials. Those having a $\Delta\in$ in the range of 20 to 50, and Tc in the range of 80 to 130° C. are preferable. Two or more types of nematic liquid crystals may be contained in the same composition. In that case, these ranges are applied to the $\Delta\in$ and Tc for these mixtures. When the $\Delta\in$ of a nematic liquid crystal or crystals is in this range, the $\Delta\in$ of the liquid crystal composition can be easily controlled to the above-described range. The situation is the same for Tc.

Regarding the viscosity of the liquid crystal composition according to the present invention, as was described already, the lower it is, the more easily controlled the increase in the driving voltage and decrease in contrast at a low temperature can be. The viscosity is preferably in the range of 20 to 1200 mPa·s at the time of driving (that is, in the range of 0 to 50° C.). Rise in the driving voltage and decrease in contrast will become remarkable above this range. These problems are particularly liable to occur at a low temperature. Below this range, the memory function may be decreased. The viscosity can be determined by a commercially available viscometer.

By employing these conditions, it is possible to expand the driving temperature range to cover a wide temperature range for a low driving voltage.

The electric power consumption can be further decreased by adjusting the relative dielectric constant and specific resistance of a liquid crystal to predetermined ranges. A relative dielectric constant that is not very high is effective in decreasing the electric power consumption at wireless driving, in the same way as above. Specifically, a relative dielectric constant $\in 1$ in the range of 5 to 15 is preferable for the planar state of the liquid crystal composition. A relative dielectric constant $\in 2$ in the range of 10 to 25 is preferable for the focal conic state. If the relative dielectric constant is smaller than this range, the driving voltage rise will be larger. If the relative dielectric constant can be made smaller than the upper limit, it is possible to restrain the electric current amount, and accordingly, the electric power consumption, when the voltage is applied/released.

Furthermore, by maintaining the specific resistance of a liquid crystal composition at a high value of $10^{10}$ to $10^{13} \Omega \cdot cm$, it is possible to restrict the electric power consumption loss due to moving or the like of ionic materials in the liquid crystal, and to provide improved voltage stability, which is not only effective for a longer life of the liquid crystal but also makes it possible to realize stable wireless driving using faint electromagnetic waves as a power source. Selection of a liquid crystal and a chiral agent as components of a liquid crystal composition is effective for the adjustment of the relative dielectric constant and specific resistance.

The liquid crystal composition preferably has a refractive index anisotropy in the range of 0.15 to 0.25. A problem of dark display is liable to occur below this range. Since the reflection band $\Delta\lambda$ generally grows bigger as the refractive index anisotropy $\Delta n$ of a liquid crystal grows, a larger value is preferable. However, because a value above the above-described range results in increased light scattering in the focal conic state which leads to clouding, the contrast is liable to decrease. The refractive index anisotropy of a liquid crystal composition is a difference of the refractive index when the incident light is in the direction in parallel with the director direction, and the refractive index when the incident light is in the direction perpendicular to the director direction. It can be determined, using a commercially available Abbe refractometer, for example.

Figure 11:
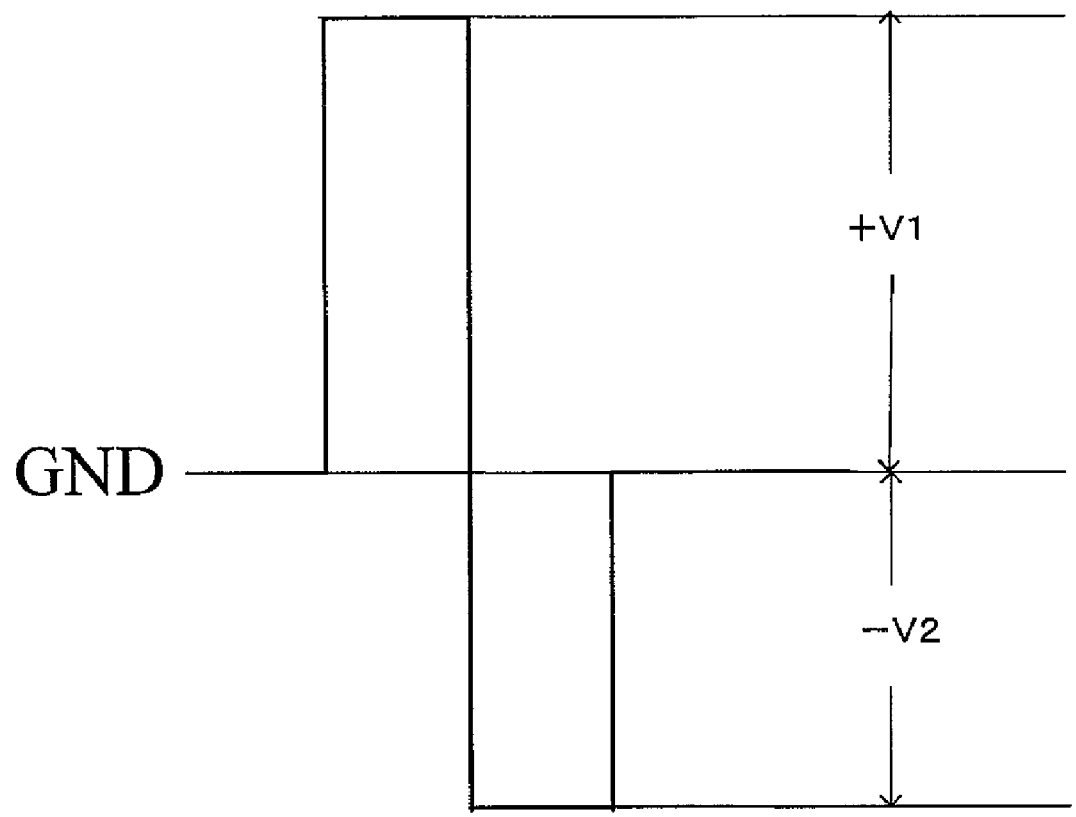
FIG. 11 is a schematic view for explaining a direct current bias in driving voltages.

The driving voltages for achieving a planar state and focal conic state are preferably in a alternate pulse form substantially without a direct current bias. Here, the direct current bias means a difference between the absolute potential values in an alternative pulse as shown in FIG. 11 (V1–V2 in FIG. 11, for example). When a direct current bias is present, the liquid crystal is degraded, leading to a lower liquid crystal reliability and a shorter liquid crystal life.

Figure 2B:
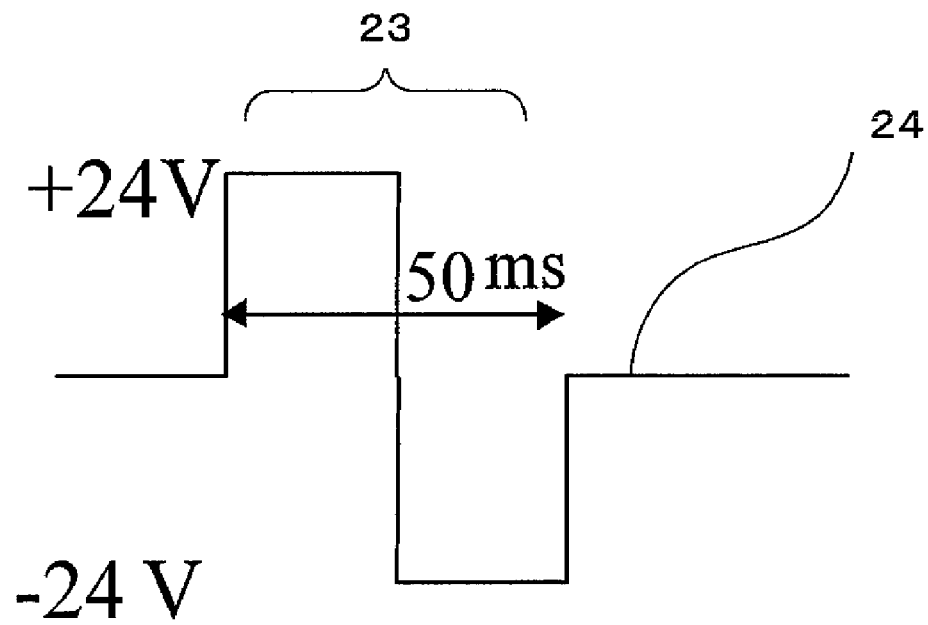

Also, by adjusting the voltage pulse application time in the transition to a planar state and in the transition to a focal conic state to a range of 0.5 to 50 milliseconds, and the rewriting frequency to a range of not more than 5 Hz, thus restricting the electric field application time in which an electric field is kept being applied to a liquid crystal, the degradation due to reactions with peripheral materials or ionic decomposition which are causes of concern for high $\Delta\in$ liquid crystals, can be restrained, and accordingly, the electric power consumption can be restricted. Here, a voltage pulse application time means the period of numeral 21 or 23 in the case of FIGS. 2A and 2B. Also, a rewriting frequency according to the present invention means a number of times to rewrite a liquid crystal display element per second. When the above-described pulse application time is shorter than the above-described range, it is not possible to obtain a desired brightness and contrast. When the above-described pulse application time is longer than the above-described range, the electric power consumption will increase. When the above-described rewriting frequency is larger than the above-described range, the electric power consumption will increase which is a disadvantage for wireless driving.

It is further possible to decrease the electric power consumption, by limiting to not more than 100 cm² for example, the area of overlapping of a pair of electrodes when seen from a direction perpendicular to the display screen of a liquid crystal display element. It is possible to greatly decrease the electric power consumption by combining the above-described conditions. Specifically, it is possible to carry out stable wireless driving of a liquid crystal display element without a battery and at an electric power consumption of several mW. For example, it is possible to generate voltage pulses at the driving, by the energy of electromagnetic waves in the vicinity of the liquid crystal display element, with a result that the display of the liquid crystal display element can be altered without a power source. It is favorably applied to RF-ID uses.

Both monochromatic display and multicolor display are possible with a liquid crystal display element according to the present invention. One such set as above is sufficient for monochromatic display. Any known technology can be chosen for multicolor display. When there are two or more such sets as above, it is possible to realize multicolor display by having each set realize an independent color.

Figure 12:
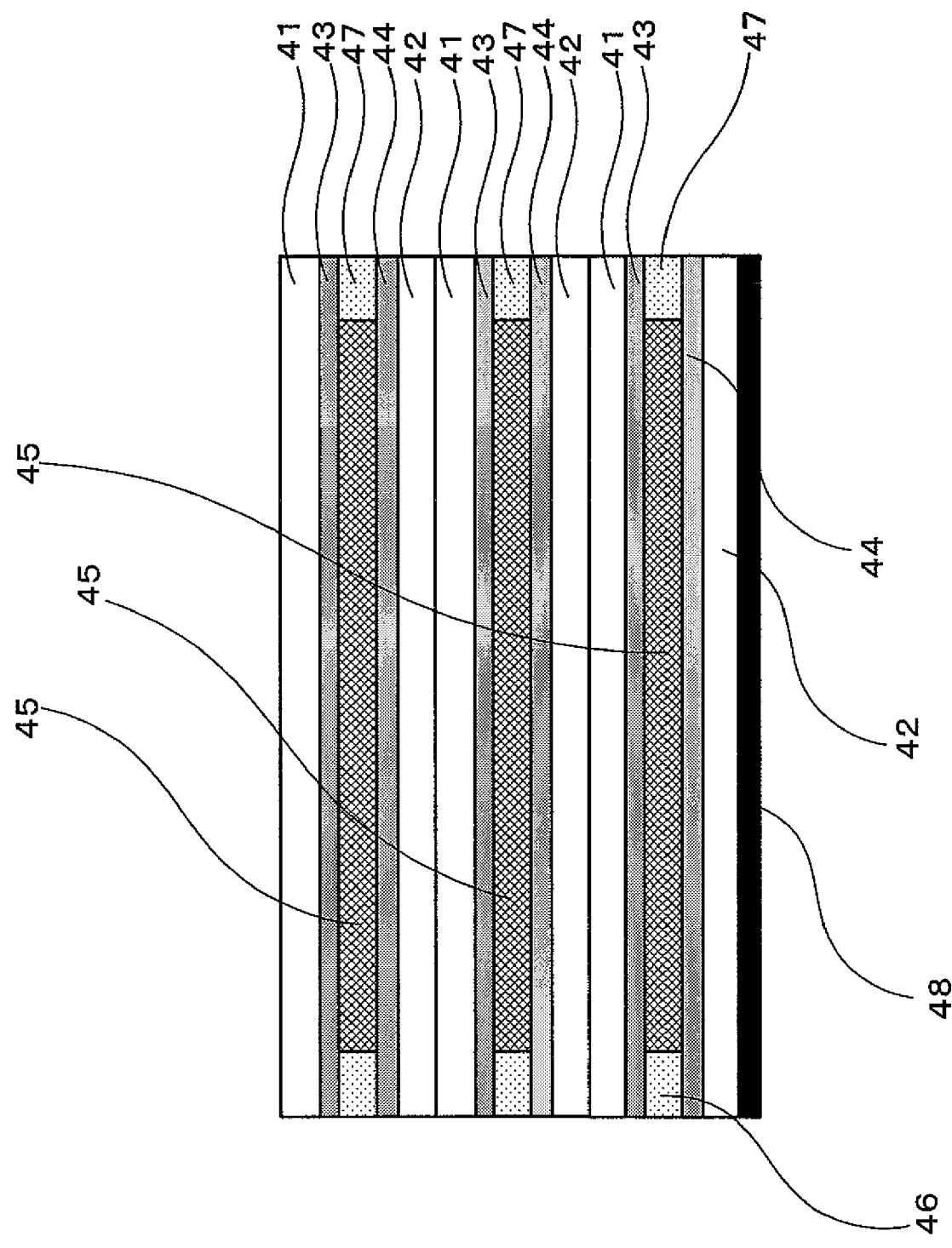
FIG. 12 is a schematic cross-sectional view of an exemplary multi-color display device.

As a method for realizing multicolor display, any kind of method may be adopted. For example, there is a method for realizing multicolor display by overlapping a plurality of sets as shown in FIG. 12 to mix the colors of the respective sets. The color of each set can be realized by selecting the type of liquid crystal to provide reflected waves with appropriate wavelengths.

In this case, it is also possible to limit the wavelength range of the waves reflected by a set, by adding to the liquid crystal composition of the set, a pigment that absorbs an independent color. For example, the purity of a red color can be further improved by mixing a pigment that absorbs a blue color and a pigment that absorbs a green color into a liquid crystal composition that reflects a red color light.

When there are a plurality of the above-described sets, any set may be selected as a set including a liquid crystal composition for mixing a pigment. However, if the wavelength range to be absorbed by pigments is overlapped with the wavelength range of reflected waves of the liquid crystal composition of a set that is behind the set including the liquid crystal composition with the added pigment, when seen from the display side, the wavelengths of reflected waves are absorbed by the pigment, against which care must be taken.

Color filters may be used instead of addition of a pigment. As materials for these color filter layers, materials obtained by adding pigments to colorless, transparent materials, materials in a inherently pigmented state without addition of pigments, and thin films of certain substances that function in the same way as pigments, are enumerated. The same effect can be obtained by substituting a filter layer material for the transparent substrate itself, instead of placing a color filter layer.

In this case, it is preferable from the viewpoint of cost reduction to select the $\Delta\in$, viscosity and Tc of each liquid crystal composition so that each of the above-described two or more sets can be driven by the same driving circuit. Specifically, it is convenient to adjust each value within ±10% of the average value.

Figure 4:
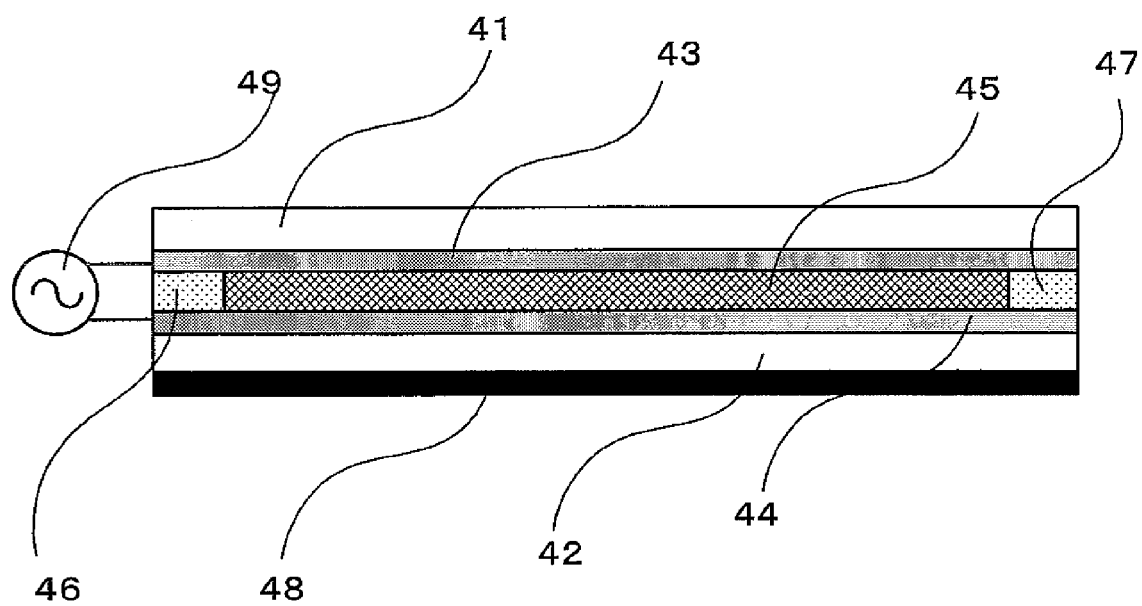
FIG. 4 is a schematic view showing a cross-sectional structure of one example of a liquid crystal display element according to the present invention.

Next, the structure of a liquid crystal display element according to the present invention will be explained illustratively using FIG. 4. FIG. 4 is a schematic view showing the cross-sectional structure of an example of a liquid crystal display element according to the present invention. This liquid crystal display element has a memory function, since it uses a cholesteric liquid crystal composition showing a cholesteric phase, and the planar state and focal conic state are maintained even after the application of the pulse voltages is ceased.

In FIG. 4, electrodes 43, 44 in stripe shapes on the light-transmitting substrates 41, 42 sandwiches a liquid crystal layer 45 of a liquid crystal composition, and face each other so that the stripes intersect each other when seen from the direction perpendicular to the substrates. The gap in the liquid crystal layer 45 is secured by a spacer (not shown). Resinous or inorganic spheres can be used for a material of the spacer. Fixedly placed spacers the surface of which are coated with thermoplastic resins are also favorably used.

It is preferable that the electrodes are coated at least with an insulating thin film to insulate the liquid crystal layer from the electrodes and/or alignment control film (not shown) to facilitate alignment of the liquid crystal towards a planar state or focal conic state in the vicinity of the interface. Insulating thin films often have gas barrier properties, which is preferable. Depending on situations, an insulating thin film and alignment control film may be only on one of the electrodes. An insulating thin film also plays a role of an alignment control film. While an alignment control film must be placed in contact with the liquid crystal layer, an insulating thin film may be in contact with any layer only if it is between an electrode and the liquid crystal layer, except where the insulating thin film also plays a role of an alignment control film. A visible light absorbing layer 48 is installed, as is necessary, on the outer surface (rear surface) of the substrate that is opposite to the one which the incident light enters. The liquid crystal composition of the liquid crystal layer 45 is sealed with a seal material 46, 47. The present liquid crystal display element is driven by a pulse power supply 49 to apply a certain voltage in the pulse form.

Both substrates 41, 42 are light transmitting in this example. However, it is necessary for at least one of a pair of substrates which can be used for a liquid crystal display element according to the present invention to be light transmitting, and it is not always necessary for both of the substrates to be light transmitting.

In the way as is described above, it is possible according to the present invention, to realize a liquid crystal display element that employs a cholesteric liquid crystal having features such as semi-permanent display maintaining function (memory function), bright color display, high contrast and high resolution, wherein one or more of lowered driving voltage, expanded operating temperature range, reduced electric power consumption and wide range of display maintaining temperature are achieved, so that the general-purpose applicability of a liquid crystal display element can be greatly expanded.

By these effects, for example, the above described liquid crystal display element can be preferably used for electronic paper uses. In particular, it can be favorably used for electronic books and RF-ID uses as devices that perform contact-free communication or contact-free communication/recognition. Here, communication means one for exchanging information between the present device and a device in the vicinity, and recognition means that the device in the vicinity recognizes the present device (accordingly, the carrier of the present device) by this communication.

The following are explanations of materials for the parts according to the present invention.

Glass substrates are examples for the substrate according to the present invention. Film substrates such as PET film substrates and PC film substrates can be used besides glass substrates. Opaque substrates may be used for the substrate on the other side of the display side (opposite to the substrate that transmits the incident light).

ITO (Indium Tin Oxide) is a representative material for an electrode that has a light transmitting property according to the present invention. Other than that, transparent conductive films from materials such as IZO (Indium Zinc Oxide), metal electrodes from materials such as aluminum and silicon, or photoconductive films from materials such as amorphous silicon and BSO (Bismuth Silicon Oxide), can be employed. The electrode on the opposite side of the display side is not necessarily light transmitting, as long as the surface can be made light-absorbing, and common metals such as copper and aluminum as well as alloys thereof may be used.

The nematic liquid crystal according to the present invention may also be selected from those shown in FIGS. 13 and 14 as well as mixtures thereof, for example.

Any known chiral agent may be used as a chiral agent according to the present invention. FIG. 5 is an example. The physical properties are shown in EXAMPLE 1.

A liquid crystal composition according to the present invention may contain a pigment other than the above-described nematic liquid crystal and chiral agent.

For this pigment, various conventionally known pigments may be used. Those that have good compatibility with a liquid crystal are preferable. For example, azo compounds, quinone compounds, anthraquinone compounds or dichromatic pigments can be used. A plurality of them may be used. The amount to be added is preferably not more than 3 parts by weight, when the total amount of the liquid crystal component and chiral agent is 100 parts by weight.

It is necessary that the insulating thin film according to the present invention has a volume resistance ($\Omega\cdot CM$) that is at least bigger than that of the liquid crystal. Inorganic films of materials such as silicon oxide, and organic films of materials such as polyamide resins, epoxy resins, acrylic resins and urethane resins are the examples.

As an alignment control film according to the present invention, organic films of materials such as polyimide resins, polyamideimide resins, polyether imide resins, polyvinylbutyral resins and acrylic resins, as well as inorganic films of materials such as silicon oxide and aluminum oxide are examples.

EXAMPLES

EXAMPLES of the present invention are explained in detail, with reference to the attached drawings. The evaluation methods below were employed.

(Reflectance and Contrast of a Liquid Crystal Display Element)

Regarding the liquid crystal display elements in the respective EXAMPLES explained below, high reflectance states were realized when they were in the planar state, and low reflectance states were realized when they were in the focal conic state.

The reflectance was determined as a visual recognition reflectance (Y value), using a reflection-type spectrometer. The smaller the Y value is when the color display is off, the more transparent and the better the black display is. The larger the Y value is when the color display is on, the better the color display is.

The contrast was given by (Y value in a planar state/Y value in a focal conic state).

(Specific Resistance and Relative Dielectric Constant)

After a liquid crystal composition was poured into a glass-made test cell having a 1 cm by 1 cm display area, the values were determined by a commercial LCR meter.

(Driving Voltage)

Voltage in a rectangular wave form with a pulse width of 50 milliseconds as shown in FIG. 2-A was applied to a liquid crystal display element at room temperature or at a specified temperature to determine the minimum voltage obtained in a perfect planar state.

(Display Maintaining Temperature)

After a liquid crystal display element was put in the planar state or focal conic state at room temperature, it was kept at a specified temperature for about 100 hours. Then, it was observed whether the original state was maintained or not. The temperature values at which the original state was maintained were investigated at a 5° C. interval to find the upper limit and lower limit, both for the planar state and focal conic state.

Example 1

Patterning in a stripe shape at a 0.24 mm pitch was made by etching on two ITO transparent electrodes installed on polycarbonate (PC) film substrates having a cut size of 12×10 cm so that VGA display with 640×480 dots could be shown. The area formed by the overlapping of these pair of electrodes when seen from the direction perpendicular to the display screen of the liquid crystal display element was 135 cm$^2$.

Afterwards, a polyimide alignment control film material was applied onto the transparent electrodes of both substrates to a thickness of about 700 angstrom (converted value being about 70 nm) by spin coating. Then, baking treatment was carried out in a oven at 90° C. for one hour to form the alignment control films. The electrostatic capacity of each alignment control film was then calculated to be about 2.5 μF, and the sum was about 5 μF. This alignment control film had a volume resistance value of about $10^{16}$Ω·CM. It is considered to be an insulating thin film according to the present invention.

Next, an epoxy sealing agent was applied with a dispenser onto the peripheral part of one of the substrates to form walls having a specific height. Subsequently, a spacer having a diameter of 4 μm (a product of Sekisui Fine Chemical) was dispersed over the alignment control film on the other substrate. Afterwards, the above substrates were bonded together, and heated at 160° C. for one hour to cure the sealing agent.

Next, to a nematic liquid crystal C (the refractive index anisotropy Δn being 0.22, Δ∈ being 20.4, viscosity being 53 mPa·s at room temperature, and Tc being 92° C.) formed by mixing a commercially available nematic liquid crystal A (the refractive index anisotropy Δn being 0.24, Δ∈ being 6.5, viscosity being 28 mPa·s at room temperature, and Tc being 101° C.) and a commercially available nematic liquid crystal B (the refractive index anisotropy Δn being 0.20, Δ∈ being 34.3, viscosity being 77 mPa·s at room temperature, and Tc being 82° C.) at about 1:1 (weight ratio), added were a chiral agent A (Δ∈ being 22, and Tc being 60° C.) and a chiral agent B (Δ∈ being 26, and Tc being 118° C.) both of which were commercially available, and had structures shown in FIG. 5 (R in FIG. 5 being a hydrocarbon group and containing a plurality of asymmetric carbons), in an amount of 28% by weight per the sum of the nematic liquid crystal composition and the chiral agents, and thus, a liquid crystal composition X was prepared in which the peak wavelength of the reflected light was selected to be 560 nm or in the vicinity. The mixture of the chiral agent A and chiral agent B had a Δ∈ of 24, and a Tc of 85° C.

The above-described 28% by weight was composed of 20% by weight of the chiral agent A and the remaining 8% by weight of the chiral agent B. Therefore, the nematic liquid crystal C constituted 72% by weight. The chiral agent A and chiral agent B were solids at ordinary temperature. The refractive index anisotropy Δn and Δ∈ of the liquid crystal composition X were 0.21 and 22, respectively, in the temperature range of 0 to 50° C. Tc was 92° C. The viscosity was about 120 mPa·s at ordinary temperature, about 30 mPa·s at 50° C., and about 600 mPa·s at 0° C. Owing to this, it was found that the driving was possible in a wide temperature range of at least 0 to 50° C., during which good contrast was maintained.

The specific resistance of the liquid crystal composition X was 1.22×$10^{11}$Ω·cm, and the relative dielectric constant was 9.0 in the planar state, and 23.5 in the focal conic state.

Afterwards, the liquid crystal composition X was poured into the space between the above-described substrates by a vacuum filling method, and then the filling port was sealed with an epoxy sealant to form a liquid crystal cell. In addition, a black, light-absorbing layer was installed on the substrate on the opposite side of the side (display side) which the incident light entered.

In such a liquid crystal display element, when a pulse voltage for resetting of 28 V without a direct current bias and with an effective pulse application time value (effective time) of 50 milliseconds and a pulse voltage for rewriting were applied to each line between the electrodes at room temperature, a state (planar state) to reflect a selected visible light was provided, and when a pulse voltage of 19 V without a direct current bias and with an effective time of 50 milliseconds was applied, a good light-transmitting state (focal conic state) was provided. These driving voltages were nearly constant in a wide temperature range of 0 to 50° C.

Regarding the display maintaining temperature, the liquid crystal cell was kept in a constant temperature vessel for 100 hours at a specified temperature, and then, the state was observed. It was confirmed that the prepared liquid crystal maintained the display states (planar state, focal conic state) at temperatures as high as 90° C. and as low as −20° C.

Next, VGA display was carried out on this liquid crystal display element, using one general-purpose STN (Super Twisted Nematic) driver {made by EPSON, S1D17A03 (160 outputs)} on TCP (tape carrier package) and four S1D17A04 (240 outputs). General-purpose operational amplifiers and zener diodes may be used to stabilize the voltage inputted to the driver, as is necessary. Also, if necessary, analog switches for switching the output voltage in response to the pixel data may be used at a stage prior to the operational amplifier.

Figure 9:
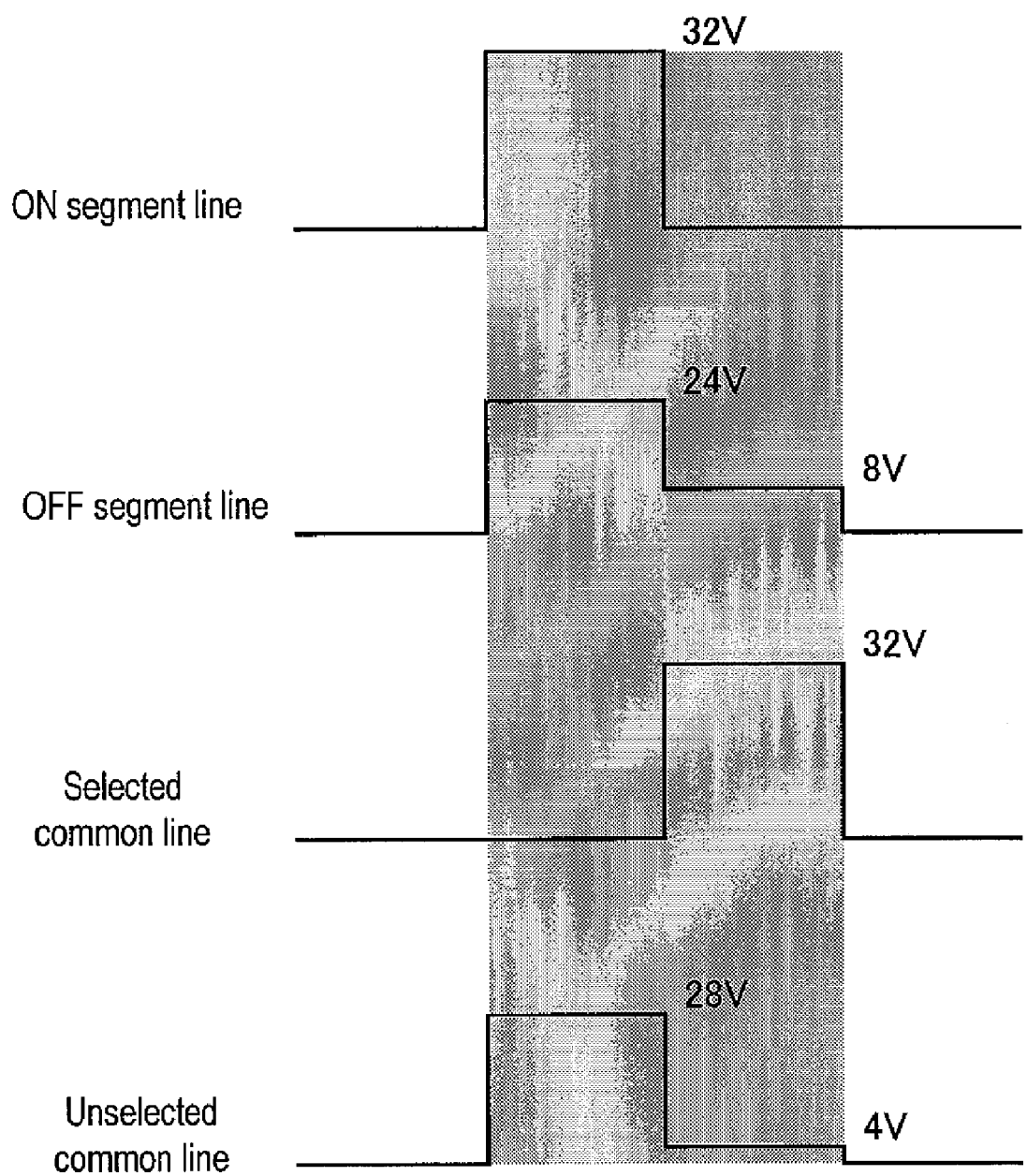
FIG. 9 is a schematic view showing how input driving voltages of an STN driver are applied.

Voltages were controlled on the common side (scan side) and segment side (data side) of the STN driver to produce outputs as shown in FIG. 9. The change in the applied voltages to move to the planar state (combinations of +32 V, −32 V and 0 V) was obtained by subtracting the output voltage of a selected common line from the output voltage of the ON segment line. The change in the applied voltages to move to the focal conic state (combinations of +24 V, −24 V and 0 V) was obtained by subtracting the output voltage of a selected common line from the output voltage of the OFF segment line. By subtracting the output voltage of an unselected common line from the output voltage of the ON segment line, it was possible to have combinations of +4 V, −4 V and 0 V which could limit the change in the applied voltage to a level that did not change the planar state or focal conic state that had been already displayed. By subtracting the output voltage of an unselected common line from the output voltage of the OFF segment line, it was also possible to have combinations of −4 V, +4 V and 0 V.

Figure 10:
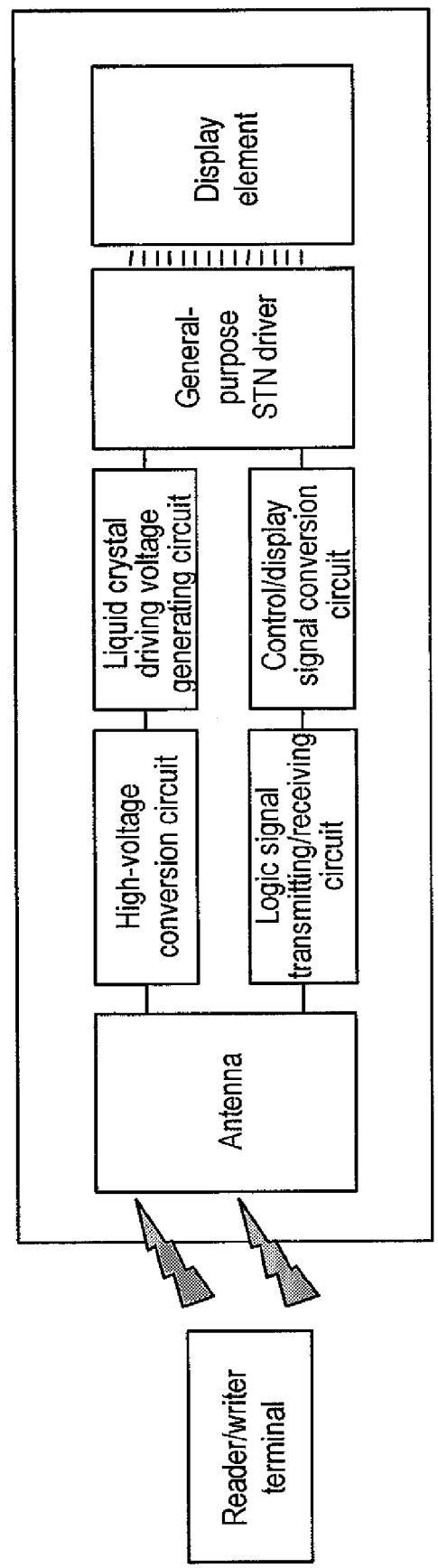
FIG. 10 is a block diagram of a driving circuit according to the present invention.

Afterwards, a high frequency power supply, a control circuit, and a driver IC equipped with an antenna were installed on the element as shown in FIG. 10 to carry out short-distance wireless communication at an electric wave output of about 10 mW. A desired display was possible at a predetermined voltage without a battery.

Example 2

Figure 6:
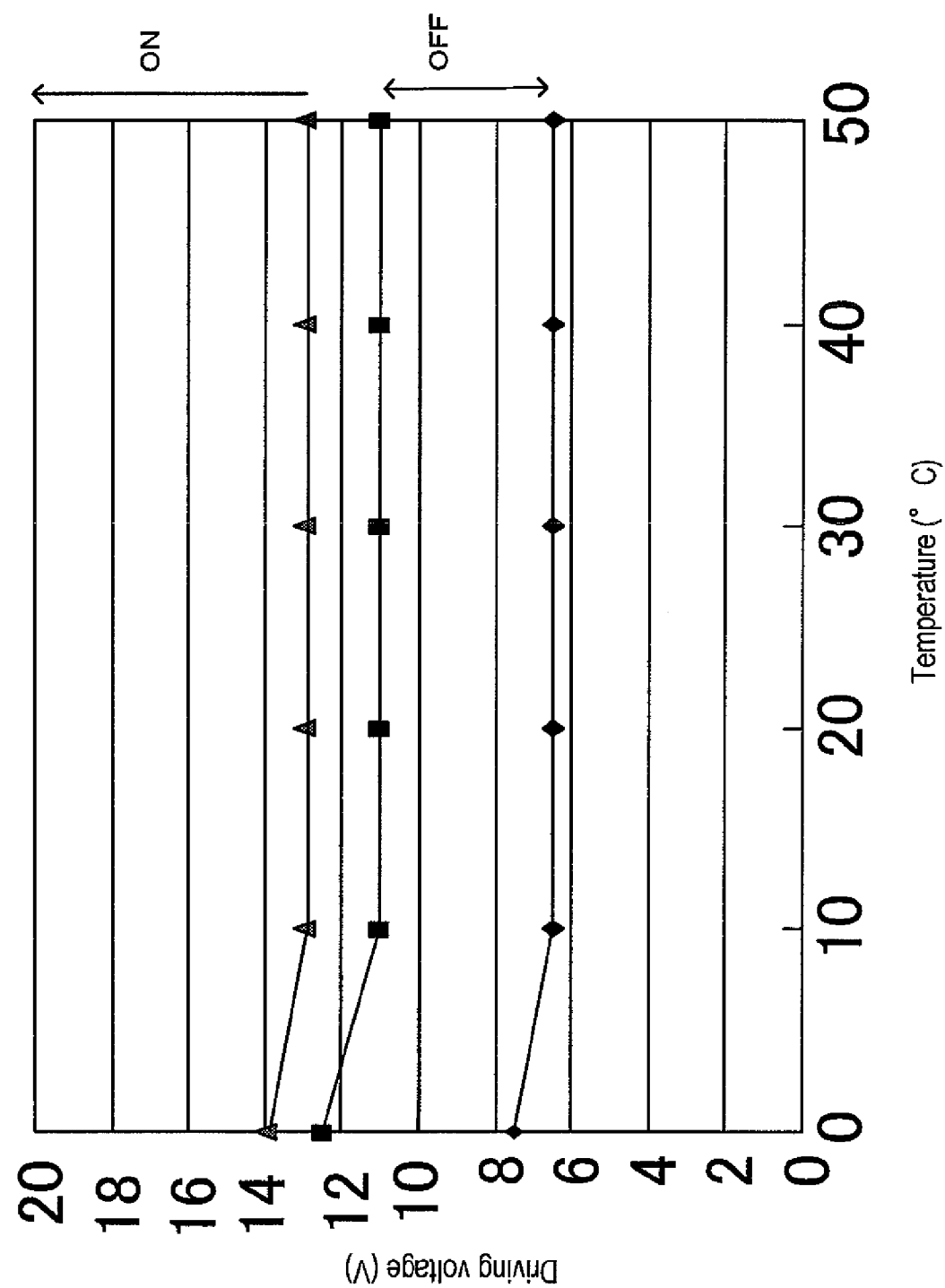
FIG. 6 is a graph showing the temperature dependency of driving voltages.

A liquid crystal display element using a 3 μm-diameter spacer that had a size of about 2×1 cm was prepared (other conditions being the same as EXAMPLE 1) as a display part for IC cards. The result is shown in FIG. 6. The abscissa axis in FIG. 6 represents the temperature at the time of driving, and the ordinate axis represents the driving voltage. The driving voltages on or above the line which connects data represented by ▲ marks refer to driving voltages that can realize a complete planar state, the driving voltages between the line connecting the data represented by ■ marks and the line connecting the data represented by ♦ marks refer to driving voltages that can realize a complete focal conic state.

It is understood from FIG. 6 that in such a liquid crystal display element, when a pulse voltage having a driving voltage of 14 V and an effective time of 50 milliseconds, for example, was applied at temperatures in the range of 0 to 50° C., the selected state (planar state) of reflected light was obtained, and when a pulse voltage having a voltage of 9 to 10 V and an effective time of 50 milliseconds was applied, a good light-transmitting state (focal conic state) was obtained. On this account, it is possible to use a general-purpose IC, and thus, cost reduction can be achieved.

It was confirmed that, also in this case, the display states (planar state, focal conic state) were maintained at a high temperature of 90° C. and at a low temperature of −60° C., in the same way as EXAMPLE 1.

Next, a high frequency power supply, a control circuit, and a driver IC equipped with an antenna were installed on the liquid crystal display element to carry out short-distance wireless communication at an electric wave output of about 10 mW. A desired display was possible at a predetermined voltage without a battery. The electric power consumption (excluding one for the driving circuit) of this liquid crystal display element was as extremely small as not more than 1 mW.

Although the cell gap was made to be as small as 3 μm, the decrease in brightness could be restricted to a minimum. In this way, the small cell gap made it possible to realize 14 V driving, and further use of inexpensive ICs.

Example 3

In the following experiments, liquid crystal display elements were prepared as in EXAMPLE 1, except that the compositions of liquid crystals and chiral agents were changed variously.

Figure 7:
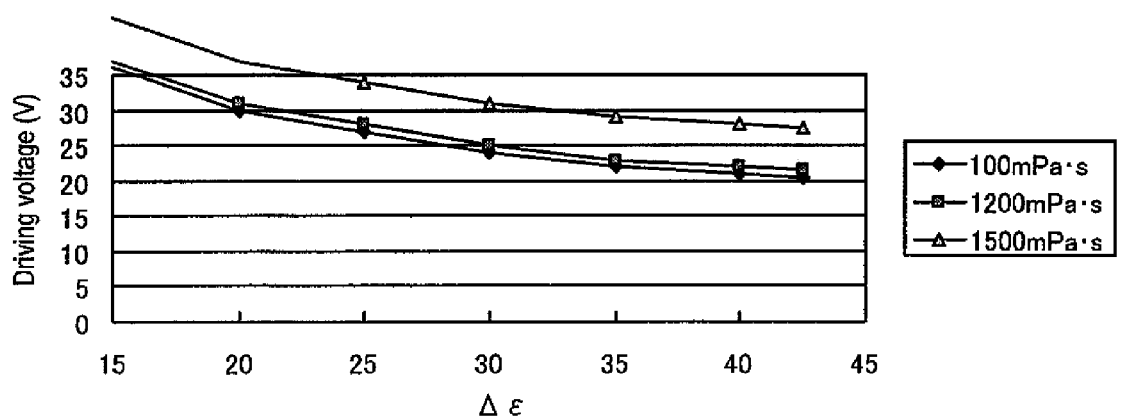
FIG. 7 is a graph showing the $\Delta \in$/viscosity dependencies of driving voltages.

FIG. 7 is a graph showing the relationship between the $\Delta\in$/viscosity of the liquid crystal composition according to the present invention and the driving voltage. It is understood that the condition of a driving voltage not more than 32V is satisfied by $\Delta\in \geqq 20$ and the viscosity $\leqq 1200$ mPa·s as in the present invention.

Figure 8:
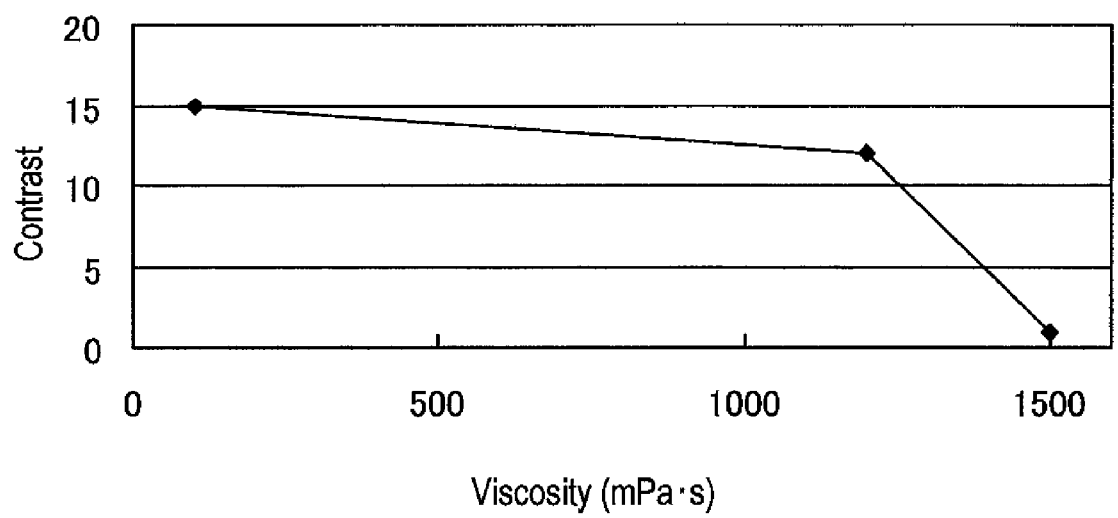
FIG. 8 is a graph showing the viscosity dependency of contrast.

FIG. 8 is a graph showing the relationship between the viscosity and contrast. It shows a case in which when the viscosity >1200 mPa·s at a low temperature, the transmittance of the focal conic state falls (that is, scattering is increased), and the contrast decreases sharply.

In addition to this, when the specific resistance of the liquid crystal was less than $10^{10}$, the electric power consumption at the time of driving increased greatly, and the wireless driving became unstable. Furthermore, degraded display qualities such as display burn-in were observed.

In addition, when the relative dielectric constant $\in$ was below the range of 5 to 15 in the planar state, or the range of 10 to 25 in the focal conic state, $\Delta\in$ also fell, leading to a raised driving voltage, making it difficult to use general-purpose ICs, and also making wireless driving difficult. On the other hand, when the relative dielectric constant exceeded the above-described range, the charging/discharging amounts of electric charges of a liquid crystal display element at the time of driving became larger, and the electric power consumption increased, making the wireless driving unstable.

Example 4

Next, TABLE 1 shows an example wherein evaluation was made by changing the condition of added chiral agents. The driving voltages were those at room temperature. The same nematic liquid crystal as in EXAMPLE 1 was used. As a conventional chiral agent, one having a $\Delta\in$ of about 0 (zero) and a Tc of about 50° C. was used.

In the case of a liquid crystal composition which was adjusted to have a selected peak wavelength of reflected waves in the vicinity of 560 nm by only using the chiral agent A, Tc fell, and the upper limit of the display maintaining temperature went down to about 70° C.

Furthermore, in the case of a liquid crystal composition which was adjusted to have a selected peak wavelength of reflected waves in the vicinity of 560 nm by only using the chiral agent B, the driving voltage was 32V at ordinary temperature, and the display maintaining temperature was in the range of −20 to 95° C. which was superior to that of the case of the conventional chiral agent at the leftmost column. However, the viscosity at a low temperature of not more than 10° C. increased to not less than 1200 mPa·s, resulting in remarkable increase in the driving voltage and remarkable fall of the contrast at the low temperature.

To compare, in the case of the liquid crystal display element of EXAMPLE 1 (the rightmost column), it was found possible to satisfy all the important features of a low driving voltage, wide operating temperature range, wide display maintaining temperature, low electric power consumption, etc., by using adequate amounts of both chiral agents A and B.

TABLE 1

| ITEM | Nematic Liq. Cry. + Conventional chiral agent | Nematic Liq. Cry. + Chiral agent A | Nematic Liq. Cry. + Chiral agent B | Nematic Liq. Cry. + Chiral agent A + B |
|---|---|---|---|---|
| Driving Voltage (V) | 35 | 28 | 32 | 29 |
| Display Maintaining Temp. (° C.) | −10-70 | −20-70 | −20-95 | −20-90 |

INDUSTRIAL APPLICABILITY

According to this invention, it is possible to improve the performance of a liquid crystal display element using a cholesteric liquid crystal.

What is claimed is:

1. A liquid crystal display element comprising one or more sets of combinations of a pair of substrates having a pair of electrodes at least one of which is light transmitting, a liquid crystal layer composed of a liquid crystal composition indicating a cholesteric phase, said liquid crystal layer being disposed between said pair of substrates, and at least one layer of insulating thin film to insulate said liquid crystal layer from an electrode, wherein:
   said insulating thin film has an electrostatic capacity of not more than 10 µf;
   said liquid crystal layer has a layer thickness in the range of 2 to 5 µm; and
   said liquid crystal composition has a dielectric anisotropy in the range of 20 to 50, a specific resistance of $10^{10}$ to $10^{13}$ cm, a relative dielectric constant $\in 1$ in a planar state of 5 to 15, and a relative dielectric constant $\in 2$ in a focal conic state of 10 to 25.

2. A liquid crystal display element according to claim 1, wherein said liquid crystal composition has an isotropic phase transition temperature of not less than 80° C.

3. A liquid crystal display element according to claim 1, wherein said liquid crystal composition comprises a nematic liquid crystal, and chiral agent that has a dielectric anisotropy in the range of 20 to 70 and an isotropic phase transition temperature in the range of 80 to 130° C.

4. A liquid crystal display element according to claim 3, wherein said chiral agent comprises a chiral agent having a dielectric anisotropy in the range of 20 to 70 and a chiral agent having an isotropic phase transition temperature in the range of 80 to 130° C.

5. A liquid crystal display element according to claim 1, wherein said liquid crystal composition comprises a nematic liquid crystal, and one or more chiral agents that have a plurality of asymmetric carbons in a molecule.

6. A liquid crystal display element according to claim 1, wherein said nematic liquid crystal has a dielectric anisotropy in the range of 20 to 50 and an isotropic phase transition temperature in the range of 80 to 130° C.

7. A liquid crystal display element according to claim 1, wherein said liquid crystal composition has a viscosity in the range of 20 to 1200 mPa·s at the time of driving of said liquid crystal display element.

8. A liquid crystal display element according to claim 1, wherein said liquid crystal composition is driven to a planar state and a focal conic state each by a driving voltage in an alternating pulse form substantially without a direct bias.

9. A liquid crystal display element according to claim 8, wherein each of said alternating pulses has a pulse application time in the range of 0.5 to 50 milliseconds and a rewriting frequency of not more than 5 per second.

10. A liquid crystal display element according to claim 1, wherein said liquid crystal composition has a refractive index anisotropy in the range of 0.15 to 0.25.

11. A liquid crystal display element according to claim 1, wherein said liquid crystal display element has a driving circuit having an IC with a withstand voltage of not more than 35 V.

12. A liquid crystal display element according to claim 1, wherein said pair of electrodes have an overlapping area of not more than 100 $cm^2$ when viewed in the direction perpendicular to a screen of said liquid crystal display element.

13. A liquid crystal display element according to claim 1, said element being able to be wirelessly driven.

14. A liquid crystal display element according to claim 1, wherein there are two or more of said sets to make a multicolor display possible.

15. A liquid crystal display element according to claim 14, wherein said multicolor display is made possible by color mixing of respective reflected colors from said sets.

16. A liquid crystal display element according to claim 14, wherein the dielectric anisotropy, viscosity and isotropic phase transition temperature of each liquid crystal composition from said two or more sets are selected so that each of the two or more sets is able to be driven by the same driving circuit.

17. Electronic paper using a liquid crystal display element according to claim 1.

18. A device using a liquid crystal display element according to claim 1 that performs at least one of contact-free recognition and contact-free communication.

* * * * *